(12) United States Patent
Jiang et al.

(10) Patent No.: US 12,358,390 B2
(45) Date of Patent: Jul. 15, 2025

(54) CUSTOMIZED CHARGING PROTOCOLS

(71) Applicant: GM GLOBAL TECHNOLOGY OPERATIONS LLC, Detroit, MI (US)

(72) Inventors: Meng Jiang, Rochester Hills, MI (US); Raghunathan K, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 708 days.

(21) Appl. No.: 17/680,445

(22) Filed: Feb. 25, 2022

(65) Prior Publication Data

US 2023/0271521 A1 Aug. 31, 2023

(51) Int. Cl.
*B60L 53/62* (2019.01)
*B60L 53/65* (2019.01)
*B60L 58/13* (2019.01)
*B60L 58/16* (2019.01)

(52) U.S. Cl.
CPC ............... *B60L 53/62* (2019.02); *B60L 53/65* (2019.02); *B60L 58/13* (2019.02); *B60L 58/16* (2019.02)

(58) Field of Classification Search
CPC .......... B60L 53/62; B60L 53/65; B60L 58/13; B60L 58/16; B60L 2260/52; B60L 58/12; B60L 53/60; B60L 2260/58; Y02T 10/70; Y02T 10/7072; H01M 10/441
See application file for complete search history.

(56) References Cited

U.S. PATENT DOCUMENTS

2015/0134174 A1* 5/2015 Preece ................. H01M 10/44
701/22
2016/0221456 A1* 8/2016 Rhodes ............... B60L 15/2045

* cited by examiner

*Primary Examiner* — Robert Grant (57) ABSTRACT

A charging module configured to charge a battery system of a vehicle includes a usage prediction module configured to predict usage of the vehicle subsequent to a charging event, a target state of charge (SOC) calculation module configured to determine a target SOC based on the predicted usage of the vehicle subsequent to the charging event, and a charging control module configured to selectively charge the battery system, based on the predicted usage of the vehicle subsequent to the charging event, to one of the target SOC and a limited SOC.

13 Claims, 4 Drawing Sheets

CUSTOMIZED CHARGING PROTOCOLS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and, more particularly, to charging protocols for battery systems of electric and hybrid electric vehicles.

Some types of vehicles include only an internal combustion engine that generates propulsion torque. Pure electric vehicles include a battery system and an electric motor. Hybrid vehicles include both an internal combustion engine and one or more electric motors and may include a battery system. The battery system includes one or more batteries or battery modules. Each battery module includes one or more battery cells.

SUMMARY

A charging module configured to charge a battery system of a vehicle includes a usage prediction module configured to predict usage of the vehicle subsequent to a charging event, a target state of charge (SOC) calculation module configured to determine a target SOC based on the predicted usage of the vehicle subsequent to the charging event, and a charging control module configured to selectively charge the battery system, based on the predicted usage of the vehicle subsequent to the charging event, to one of the target SOC and a limited SOC.

In other features, the predicted usage of the vehicle includes an amount of time that the battery system will be stored subsequent to the charging event and prior to the vehicle being driven. The charging control module is configured to select between the target SOC and the limited SOC based on the amount of time that the vehicle will be stored. The charging control module is configured to (i) select the target SOC in response to a determination that the amount of time is less than or equal to N and (ii) select the limited SOC in response to a determination that the amount of time is greater than N. N corresponds to a predetermined amount of time. N is determined based on a type of the battery system. N is determined based on a sensitivity of a lifetime of the type of the battery system to SOC.

In other features, the target SOC is an assigned maximum SOC selected by either one of a user and a manufacturer of the vehicle. The assigned maximum SOC is less than a maximum possible SOC of the battery system. The limited SOC is less than the target SOC. The target SOC is an intermediate SOC between the limited SOC and an assigned maximum SOC. The target SOC module is configured to calculate the intermediate SOC based on a distance between a predicted destination of the vehicle and a present location of the vehicle. The target SOC module is configured to calculate the intermediate SOC in accordance with $L/S = M_L + (D)/M_S$, where L is the intermediate SOC, S is the limited SOC, $M_L$ is a mileage associated with the intermediate SOC, $M_S$ is a mileage associated with the limited SOC, and D is the distance between the predicted destination and the present location.

In other features, the charging module is further configured to charge the battery system to the limited SOC, stop charging the battery system at a first time in response to the battery system reaching the limited SOC, and restart charging the battery system to the target SOC at a second time subsequent to the first time. The second time is selected based on an amount of time required to charge the battery system from the limited SOC to the target SOC.

A method of charging a battery system of a vehicle includes predicting usage of the vehicle subsequent to a charging event, determining a target SOC based on the predicted usage of the vehicle subsequent to the charging event, and selectively charging the battery system, based on the predicted usage of the vehicle subsequent to the charging event, to one of the target SOC and a limited SOC.

In other features, the predicted usage of the vehicle includes an amount of time that the battery system will be stored subsequent to the charging event and prior to the vehicle being driven. The method further includes selecting between the target SOC and the limited SOC based on the amount of time that the vehicle will be stored. The method further includes selecting the target SOC in response to a determination that the amount of time is less than or equal to N and selecting the limited SOC in response to a determination that the amount of time is greater than N. N corresponds to a predetermined amount of time.

In other features, the target SOC is one of an assigned maximum SOC selected by one of a user and a manufacturer of the vehicle and an intermediate SOC greater than the limited SOC and less than the assigned maximum SOC. The method further includes calculating the intermediate SOC based on a distance between a predicted destination of the vehicle and a present location of the vehicle. The method further includes charging the battery system to the limited SOC, stopping charging the battery system at a first time in response to the battery system reaching the limited SOC, and restarting charging the battery system to the target SOC at a second time subsequent to the first time. The second time is selected based on an amount of time required to charge the battery system from the limited SOC to the target SOC.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Electric or hybrid electric vehicles typically include one or more rechargeable batteries or battery modules each including a plurality of battery cells (e.g., arranged in one or more battery packs). A charging system or module may be configured to control charging of the batteries when the vehicle is connected to an external power source.

In some types of batteries (e.g., Si anode batteries), battery life may be sensitive to a state of charge (SOC) of the battery. For example, when a battery is stored for an extended period time (e.g., several hours) at a high SOC (e.g., 80% or greater), battery life may be reduced. Accordingly, if a battery is fully charged during a charging period and the vehicle is not used for some time afterward, battery life may be reduced.

Battery charging systems and methods according to the present disclosure implement customized, adaptable charging protocols to minimize a storage period of the battery at high SOC to extend battery life while still providing a desired driving range. While described with respect to vehicle implementations, the principles of the present disclosure may also be used in suitable non-vehicle implementations.

Figure 1:
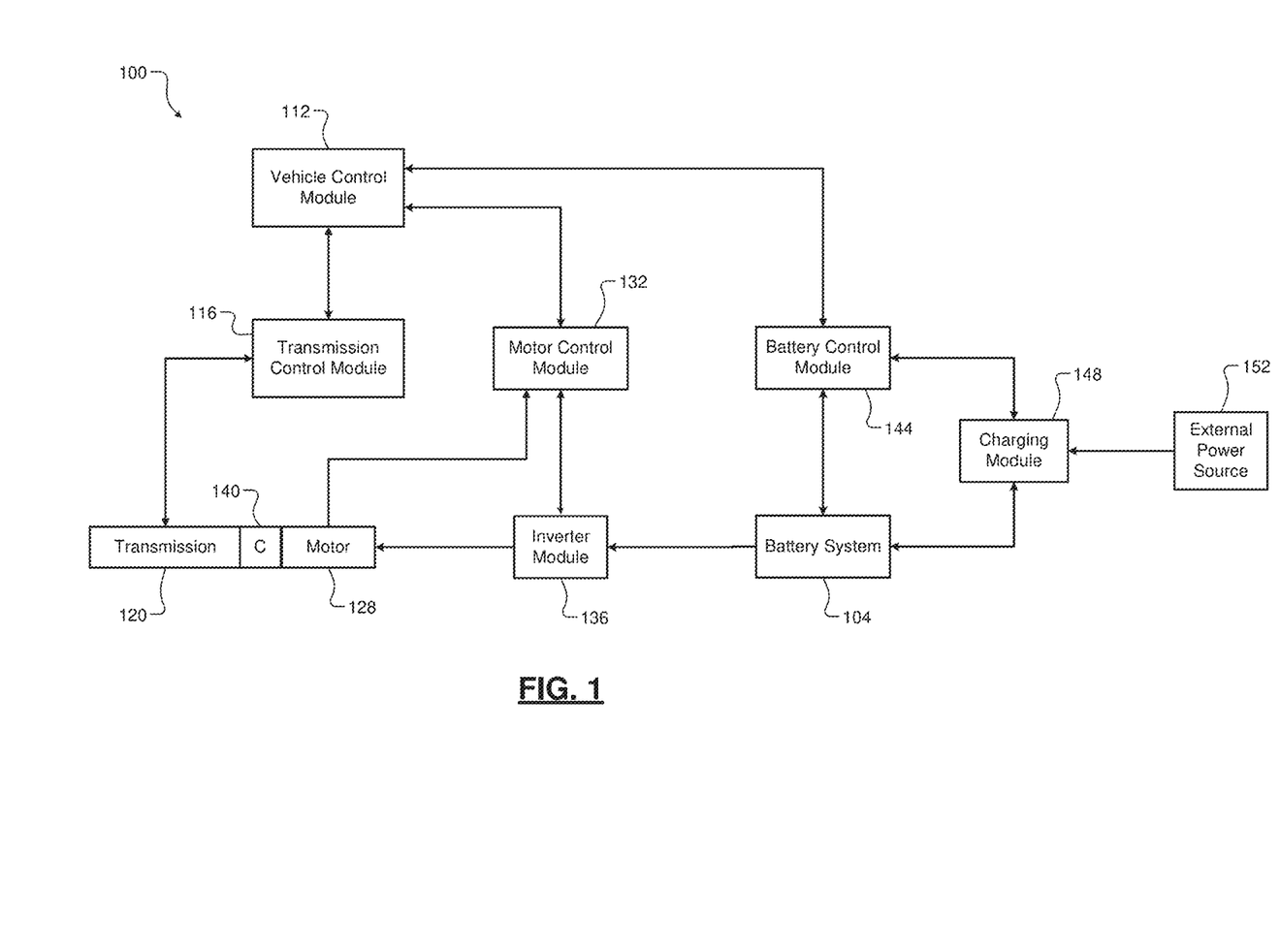
FIG. 1 is a functional block diagram of an example vehicle system including a charging module according to the present disclosure.

Referring now to FIG. 1, a functional block diagram of an example vehicle system 100 according to the present disclosure is shown. The vehicle system 100 may correspond to an autonomous or non-autonomous vehicle. The vehicle may be an electric vehicle including a battery pack or system 104 (as shown). In other examples, the principles of the present disclosure may be implemented in a hybrid electric vehicle or a non-vehicle system.

A vehicle control module 112 controls various operations of the vehicle system 100. The vehicle control module 112 may communicate with a transmission control module 116, for example, to coordinate gear shifts in a transmission 120. The vehicle control module 112 may communicate with the battery system 104, for example, to coordinate operation of an electric motor 128. While the example of one electric motor is provided, multiple electric motors may be implemented. The electric motor 128 may be a permanent magnet electric motor or another suitable type of electric motor that outputs voltage based on back electromagnetic force (EMF) when free spinning, such as a direct current (DC) electric motor or a synchronous electric motor. In various implementations, various functions of the vehicle control module 112 and the transmission control module 116 may be integrated into one or more modules.

Electrical power is applied from the battery system 104 to the electric motor 128 to cause the electric motor 128 to output positive torque. For example, a motor control module 132 (e.g., responsive to the vehicle control module 112) may be configured to control an inverter module 136 to apply the electrical power from the battery system 104 to the electric motor 128. The electric motor 128 may output torque, for example, to an input shaft of the transmission 120, to an output shaft of the transmission 120, or to another component. A clutch 140 may be implemented to couple the electric motor 128 to the transmission 120 and to decouple the electric motor 128 from the transmission 120. One or more gearing devices may be implemented between an output of the electric motor 128 and an input of the transmission 120 to provide one or more predetermined gear ratios between rotation of the electric motor 128 and rotation of the input of the transmission 120.

A battery control module (comprising, for example, a vehicle or battery management system) 144 is configured to control functions of the battery system 104 including, but not limited to, controlling switching of individual battery modules or cells of the battery system 104, monitoring operating parameters, diagnosing faults, etc.

A charging module 148 controls charging of the battery system 104. For example, the charging module 148 provides an interface between an external power source 152 (e.g., a charging station in a home or other facility, a public charging station, etc.) and the battery system 104. The charging module 148 is configured to selectively provide current from the external power source 152 to the battery system 104 during charging and to prevent flow of current from the external power source 152 to the battery system 104 to discontinue or interrupt charging. Although shown as a separate component, in some examples the functions of the charging module 148 may be implemented partially or completely within the battery control module 144, the vehicle control module 112, etc.

The charging module 148 according to the present disclose is configured to implement customized, adaptable charging protocols to minimize a storage period of the battery at high SOC to extend battery life while still providing a desired driving range as described below in more detail.

Figure 2:
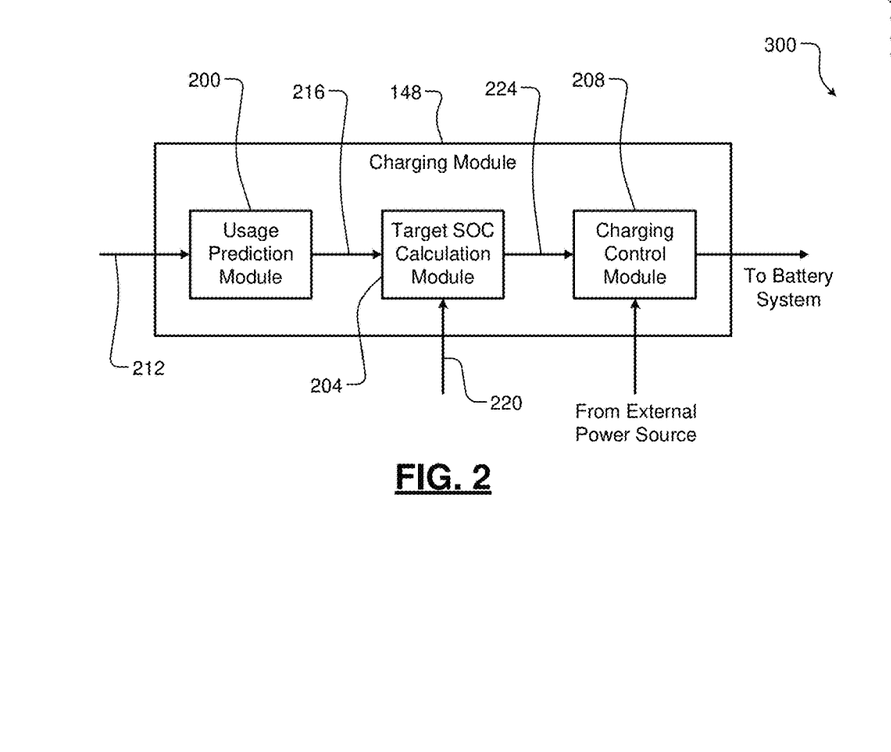
FIG. 2 is a functional block diagram of an example charging module according to the present disclosure.

FIG. 2 shows an example of the charging module 148 according to the present disclosure. For example, the charging module 148 includes a usage prediction module 200, a target SOC calculation module 204, and a charging control module 208. As noted above, one or more of the usage prediction module 200, the target SOC calculation module 204, and the charging control module 208 may be implemented within the battery control module 144, the vehicle control module 112, etc.

The usage prediction module 200 is configured to predict usage of the battery subsequent to a current charging event or period. For example, at the beginning of a charging period (e.g., in response to the battery system 104 being connected to the external power source 152), the usage prediction module 200 predicts usage parameters such as how long the battery system 104 is likely to be charged during the current charging period, how long the vehicle is likely to remain parked (i.e., unused) subsequent to charging, how many miles the vehicle is likely to be driving subsequent to charging prior to returning home or reaching another charging station, etc.

The usage prediction module 200 determines the usage parameters using one or more inputs 212 indicative of historical and/or future behavior (e.g., behavior indicators). For example, behavior indicators include, but not limited to, driver behavior and history (e.g., day, time of day, average or typical usage parameters on a same day or time, in a same location, etc.) and charging location (e.g., using GPS information).

The target SOC calculation module 204 is configured to calculate a target SOC to charge the battery system 104 to during the current charging period. For example, the target SOC calculation module 204 calculates the target SOC based on an output 216 (e.g., a signal indicating the predicted usage parameters) of the usage prediction module 200 and further based on one or more SOC limits 220. The SOC limits 220 include user and/or manufacturer defined limits as described below in more detail. The target SOC calculation module 204 generates an output 224 (e.g., a signal) indicative of the calculated target SOC.

The charging control module 208 is configured to selectively charge the battery system 104 based on the output 224 of the target SOC calculation module 204. For example, the charging control module 208 selectively provides current from the external power source 152 to the battery system 104 during charging and prevents flow of current from the external power source 152 to the battery system 104 to discontinue or interrupt charging based on the target SOC.

Figure 3:
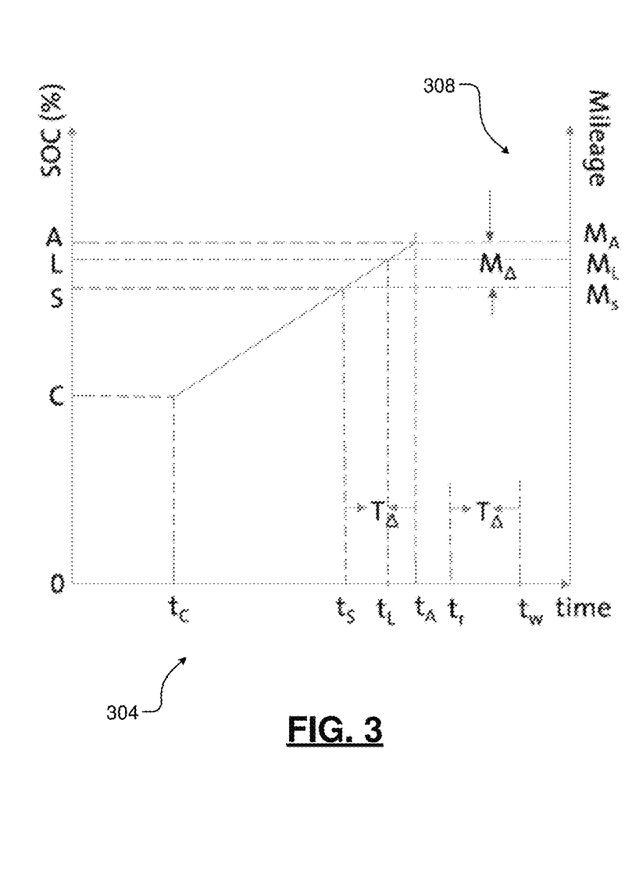
FIG. 3 illustrates example relationships between various SOC values and time according to the present disclosure.

FIG. 3 illustrates example relationships between various SOC values 300 and time 304. The SOC values 300 include a current SOC C, a first target SOC S, a second target SOC L, and a third target SOC A. For example, the first target SOC S corresponds to a low or conservative SOC (e.g., a limited SOC). The first target SOC S is selected to be significantly less than an SOC at which battery life degrades at an unacceptable rate during prolonged storage. For example only, the first target SOC S is between 50 and 60%, and can be assigned by the manufacturer or user, calculated based on predicted usage, etc.

Conversely, the third target SOC A is an assigned maximum SOC. In some examples, the assigned maximum SOC is assigned by the manufacturer but can be modified by the user. The assigned maximum SOC corresponds to an assigned maximum SOC that the charging module 148 is permitted to charge the battery system 104 to. The assigned maximum SOC is less than a maximum SOC (i.e., 100%) of the battery system 104. For example, the assigned maximum SOC is between 80 and 90%. The assigned maximum SOC may be selected based on the type of battery (e.g., materials and chemistry), observed degradation of the type of battery at various SOC levels, etc. In some examples, the assigned maximum SOC may be varied over time. For example, as battery usage increases over time, the assigned maximum SOC may decrease to minimize further battery degradation.

The second target SOC L is an intermediate SOC. The intermediate SOC is between the first (conservative) target SOC S and the third (assigned maximum) SOC A. For example, the intermediate SOC can be assigned by a user and/or calculated based on predicated usage subsequent to charging as described below in more detail.

The current SOC C is the SOC of the battery at a current time $t_C$. A time at which the battery system 104 will reach the first target SOC S (e.g., at a current charging rate) is $t_S$. A time at which the battery system 104 will reach the second target SOC L is $t_L$. A time at which the battery system 104 will reach the third target SOC A is $t_A$. The charging module 148 is configured to stop charging at $t_S$, $t_L$, or $t_A$ based on the calculated target SOC. A time at which charging is resumed or restarted (e.g., subsequent to stopping charging at $t_S$) is $t_r$. A difference between $t_S$ and $t_A$ is $T_A$. In other words, $T_A$ is the time required to charge the battery system 104 from the first target SOC S to the third target SOC A. Accordingly, $t_A$ also corresponds to the time required to charge the battery system 104 upon restarting charging at $t_r$ and a predicted departure time $t_w$.

Based on the above, the charging module 148 is configured to stop charging the battery system 104 prior to reaching the assigned maximum SOC to limit the period of time that the battery system 104 is stored (e.g., an amount of time the vehicle is parked and not power on or driven) at the assigned maximum SOC. For example, if the battery system 104 is immediately and continuously charged to the assigned maximum SOC at $t_A$, the battery system 104 is stored at the assigned maximum SOC from $t_A$ until $t_w$. Conversely, if the battery system 104 is charged only to the conservative SOC and then subsequently charged to the assigned maximum SOC immediately prior to $t_w$ (i.e., from $t_r$ to $t_w$), the period of time that the battery system 104 is stored at the assigned maximum SOC is reduced.

Although illustrated with respect to a target SOC corresponding to the assigned maximum SOC, $t_r$ and $t_w$ can be determined based on a different desired target SOC (e.g., the calculated intermediate SOC or some other value less than or greater than the assigned maximum SOC). For example, in other examples, $t_A$ corresponds to a difference between is and the desired target SOC (e.g., $t_L$) and $t_r$ is varied accordingly. In other words, $t_r$ may be shifted forward or backward to shorten or lengthen $t_A$ based on the desired target SOC at $t_w$.

Each of the target SOCs has an associated mileage as shown at 308. In other words, for each SOC, the battery system 104 is able to power the vehicle for a respective mileage M. For example, mileage $M_A$ corresponds to the assigned maximum SOC and mileage $M_S$ corresponds to the conservative SOC. $M_A$ is a difference between $M_A$ and $M_S$. $M_A$ and $M_S$ may be assigned or known values. Conversely, a mileage $M_L$ corresponding to the intermediate SOC may be calculated based on predicted usage subsequent to $t_w$. Accordingly, the intermediate SOC (L) can be calculated based on the predicated usage and the charging module 148 charges the battery system based on the intermediate SOC.

In one example, the intermediate SOC L is calculated in accordance with $$\frac{L}{S} = \frac{M_S + (D)}{M_S},$$

where D is a predicted distance between a predicted destination and a present location of the vehicle. For example, D may be selected as $D_1$ (e.g., a distance between a predicted destination (e.g., work) and a present location (e.g., home)), $D_2$ (e.g., a distance between a predicted destination and a current charging station), etc. $D_1$, $D_2$, or another value may be input by a user and/or calculated by the charging module 148 based on predicted usage (e.g., using current location, likely destination based on day and time of day, etc.).

In this manner, the charging module 148 is configured to minimize the period of time that the battery system 104 is stored (i.e., the vehicle is parked) at high SOCs. More specifically, the charging module 148 is configured to determine the length of time that the battery system 104 will be stored between completion of charging and a next time the vehicle will be operated and selectively adjust charging accordingly.

Further, the battery system 104 may have an assigned maximum waiting period N. N may be selected based on specific battery type and chemistry and may vary based on degradation and state of health of the battery system 104. For example, N may decrease as usage increases and state of health decreases. In some examples, the charging module 148 may charge the battery system 104 directly to the target SOC in response to a determination that the length of time the battery system 104 will be stored at the target SOC will be less than or equal to N. Conversely, the charging module 148 may charge the battery system 104 to a lower SOC (e.g., the conservative SOC S), stop charging, and later resume charging to the target SOC in response to a determination that the length of time that the battery system 104 will be stored at the target SOC is greater than N.

Figure 4:
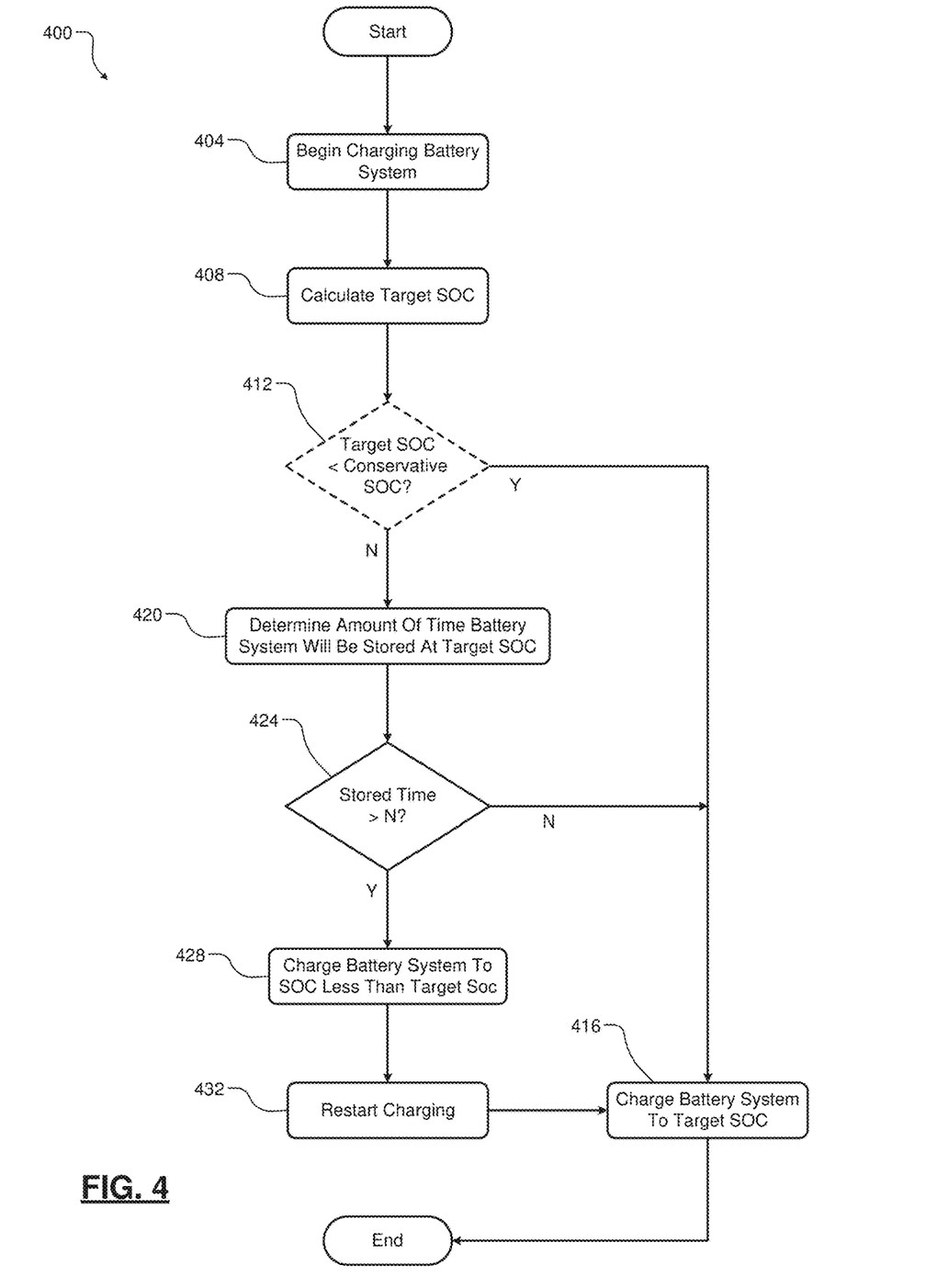
FIG. 4 illustrates steps of a first example method for charging a battery system according to the present disclosure.

Referring now to FIG. 4, a first example method 400 for charging the battery system 104 (e.g., as performed by the charging module 148) according to the present disclosure is shown. At 404, the method 400 begins charging the battery system 104. For example, the battery system 104 is connected to the external power source 152 and the charging control module 208 provides current flow from the external power source 152 to the battery system 104.

At 408, the method 400 calculates a target SOC (e.g., as described above in FIGS. 2 and 3). At 412, the method 400 optionally determines whether the target SOC is less than a predetermined conservative SOC S. If true, the method 400 continues to 416. If false, the method 400 continues to 420. At 416, the method 400 charges the battery system 104 to the target SOC. In other words, if the target SOC is not greater than the conservative SOC, the method 400 simply charges the battery system 104 to the target SOC.

At 420, the method 400 determines an amount of time that the battery system 104 will be stored at the target SOC if the battery system 104 is continuously charged to the target SOC without stopping. The target SOC may be a manufacture or user assigned SOC, a calculated target SOC based on predicated usage, etc.

At 424, the method 400 determines whether the amount of time determined at 420 is greater than N. If true, the method 400 continues to 428. If false, the method 400 continues to 416. At 428, the method 400 charges the battery system 104 to an SOC that is less than the target SOC (e.g., to the conservative SOC S). At 432, the method 400 restarts charging at a calculated restart time $t_r$ and continues to 416 to complete charging to the target SOC.

Figure 5:
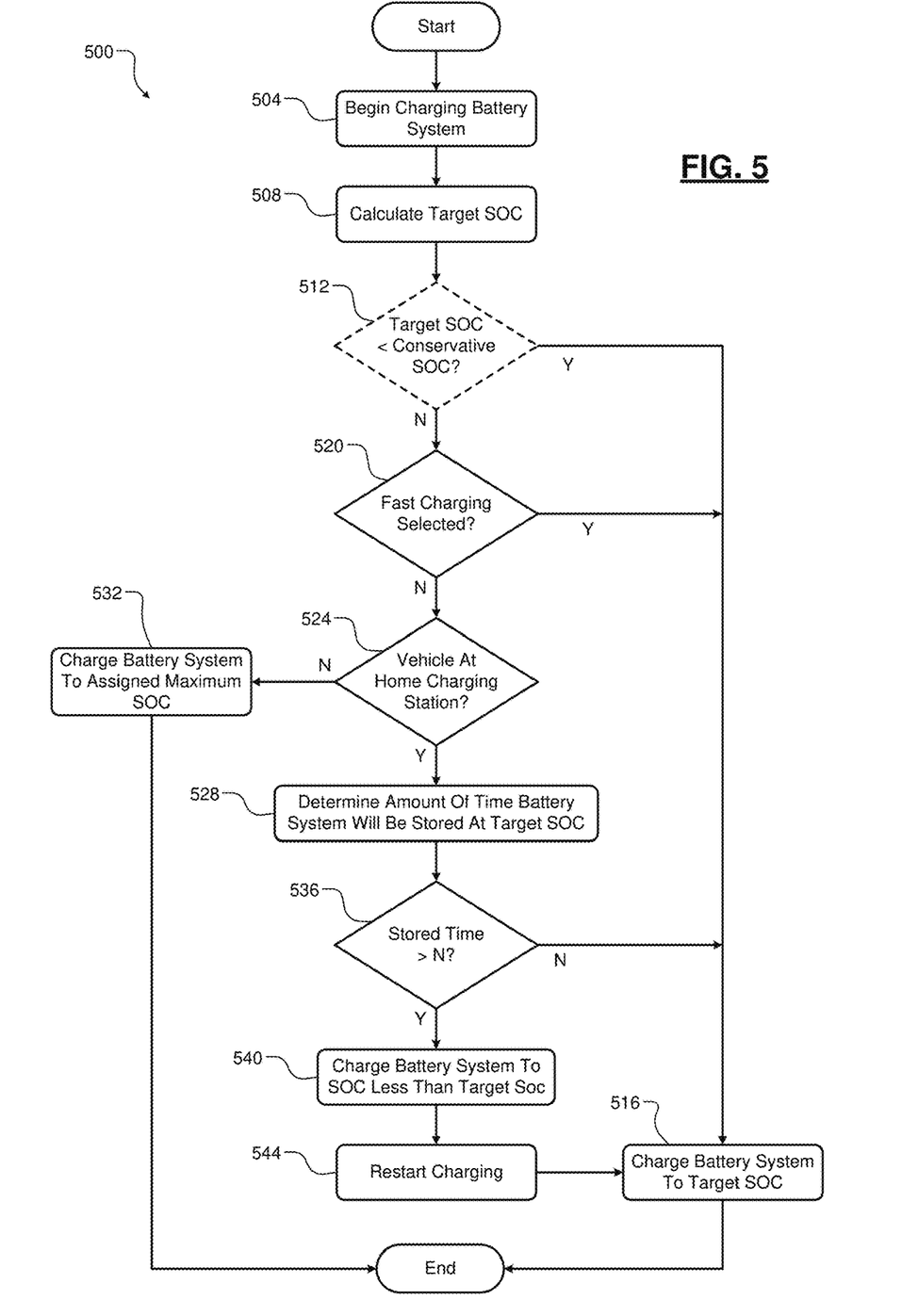
FIG. 5 illustrates steps of a second example method for charging a battery system according to the present disclosure.

Referring now to FIG. 5, a second example method 500 for charging the battery system 104 according to the present disclosure is shown. At 504, the method 500 begins charging the battery system 104. For example, the battery system 104 is connected to the external power source 152 and the charging control module 208 provides current flow from the external power source 152 to the battery system 104.

At 508, the method 500 calculates a target SOC (e.g., as described above in FIGS. 2 and 3). At 512, the method 500 optionally determines whether the target SOC is less than a predetermined conservative SOC S. If true, the method 500 continues to 516. If false, the method 500 continues to 520. At 516, the method 500 charges the battery system 104 to the target SOC. In other words, if the target SOC is not greater than the conservative SOC, the method 500 simply charges the battery system 104 to the target SOC.

At 520, the method 500 determines whether fast charging is selected or requested by a user. For example, fast charging may be selected when charging is required at a maximum rate to reach the target SOC as soon as possible. If true, the method 500 continues to 516. If false, the method 500 continues to 524. In other words, if fast charging is desired, it may be assumed that the battery system 104 will not be stored for an extended period (e.g., greater than N) at the target SOC and the method 500 simply charges the battery system 104 to the target SOC. The target SOC may be predetermined (e.g., the assigned maximum A) or may be a calculated intermediate SOC L based on current location, a navigation input, and other usage parameters as described above in FIGS. 2 and 3.

At 524, the method 500 determines whether the battery system 104 (i.e., the vehicle) is at a home charging station. The home charging station may be the charging station at the actual home of the vehicle and/or a location where the battery system 104 is typically charged (e.g., a work charging station). In some examples, the method 500 may identify two or more home charging stations. If true, the method 500 continues to 528. If false, the method 500 continues to 532.

At 532, the method 500 charges the battery system 104 to the assigned maximum SOC A. For example, if the method 500 determines that the vehicle is not at a home charging station at 524, it may be assumed that the battery system 104 is being charged at a public charging station. Accordingly, the user may want the battery system 104 to be charged as quickly as possible to a maximum assigned SOC. In some examples, the user may instead provide a navigation input to set a destination (e.g., home or another charging station) and the method 500 charges the battery system to a calculated intermediate target SOC accordingly. In other words, the method 500 may default to charging the battery system 104 to the assigned maximum SOC when the vehicle is charging at a public charging station, but a user may override this decision. For example, the assigned maximum SOC may be less than the conservative SOC.

At 528, the method 500 determines an amount of time that the battery system 104 will be stored at the target SOC if the battery system 104 is continuously charged to the target SOC without stopping. In this example, since the vehicle is at a home charging station, the target SOC may be determined based on predicted usage as describe above in various examples. For example, the target SOC may be a manufacture or user assigned SOC, a calculated target SOC based on predicated usage, etc.

At 536, the method 500 determines whether the amount of time determined at 528 is greater than N. If true, the method 500 continues to 540. If false, the method 500 continues to 516. At 540, the method 500 charges the battery system 104 to an SOC that is less than the target SOC (e.g., to the conservative SOC S). At 544, the method 500 restarts charging at a calculated restart time $t_r$ and continues to 516 to complete charging to the target SOC.

In some examples, the method 500 performs a distance comparison at 516 to determine the target SOC. For example, with reference to FIG. 3, the method 500 determines a distance D between a predicted destination and a present location of the vehicle (i.e., a distance, such as $D_1$ or $D_2$ describe above, that the vehicle will travel subsequent to charging). The method 500 compares the determined distance D to $M_A$ (i.e., a mileage difference between $M_A$ and $M_S$ as described above). If the determined distance D is greater than or equal to $M_A$, the method 500 sets the target SOC to the assigned maximum SOC A. Conversely, if the determined distance D is less than $M_A$, the method 500 sets the target SOC to the intermediate SOC L.

In other words, the target SOC may be set as the assigned maximum SOC A if the determined distance D is relatively large compared to the mileage difference $M_A$ and set as the intermediate SOC L if the determined distance D is relatively small compared to the mileage difference M.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A charging module configured to charge a battery system of a vehicle, the charging module comprising:
   a usage prediction module configured to predict usage of the vehicle subsequent to a charging event,
   wherein the predicted usage of the vehicle includes an amount of time that the battery system will be stored subsequent to the charging event and prior to the vehicle being driven, a period that the battery system will be charged during the charging event, a period that the vehicle will remain parked after the charging event, and a distance that the vehicle will be driven after the charging event prior to a next charging event;

a target state of charge (SOC) calculation module configured to determine a target SOC based on the predicted usage of the vehicle subsequent to the charging event, wherein the target SOC is an intermediate SOC between a limited SOC and an assigned maximum SOC, and wherein the target SOC module is configured to calculate the intermediate SOC in accordance with $L/S = M_S + (D)/M_S$, where L is the intermediate SOC, S is the limited SOC, $M_S$ is a mileage associated with the limited SOC, and D is the distance between a predicted destination and a present location; and a charging control module configured to selectively charge the battery system, based on the predicted usage of the vehicle subsequent to the charging event, to one of the target SOC and the limited SOC, wherein the charging control module is configured to select between the target SOC and the limited SOC based on the amount of time that the vehicle will be stored, and wherein the battery system including silicon anode batteries.

2. The charging module of claim 1, wherein the charging control module is configured to (i) select the target SOC in response to a determination that the amount of time is less than or equal to N and (ii) select the limited SOC in response to a determination that the amount of time is greater than N, wherein N corresponds to a predetermined amount of time.

3. The charging module of claim 2, wherein N is determined based on a type of the battery system.

4. The charging module of claim 3, wherein N is determined based on a sensitivity of a lifetime of the type of the battery system to SOC.

5. The charging module of claim 1, wherein the assigned maximum SOC is selected by either one of a user and a manufacturer of the vehicle.

6. The charging module of claim 5, wherein the assigned maximum SOC is less than a maximum possible SOC of the battery system.

7. The charging module of claim 1, wherein the limited SOC is less than the target SOC.

8. The charging module of claim 1, wherein the charging module is further configured to charge the battery system to the limited SOC, stop charging the battery system at a first time in response to the battery system reaching the limited SOC, and restart charging the battery system to the target SOC at a second time subsequent to the first time.

9. The charging module of claim 8, wherein the second time is selected based on an amount of time required to charge the battery system from the limited SOC to the target SOC.

10. A method of charging a battery system of a vehicle, the method comprising:

predicting usage of the vehicle subsequent to a charging event, wherein the predicted usage of the vehicle includes an amount of time that the battery system will be stored subsequent to the charging event and prior to the vehicle being driven, a period that the battery system will be charged during the charging event, a period that the vehicle will remain parked after the charging event, and a distance that the vehicle will be driven after the charging event prior to a next charging event;

determining a target SOC based on the predicted usage of the vehicle subsequent to the charging event, wherein the target SOC is an intermediate SOC between a limited SOC and an assigned maximum SOC, and wherein the calculating the target SOC includes calculating the intermediate SOC in accordance with $L/S = M_S + (D)/M_S$, where L is the intermediate SOC, S is the limited SOC, $M_S$ is a mileage associated with the limited SOC, and D is the distance between a predicted destination and a present location; and selectively charging the battery system, based on the predicted usage of the vehicle subsequent to the charging event, to one of the target SOC and the limited SOC, wherein the selectively charging includes selecting between the target SOC and the limited SOC based on the amount of time that the vehicle will be stored, and wherein the battery system including silicon anode batteries.

11. The method of claim 10, further comprising (i) selecting the target SOC in response to a determination that the amount of time is less than or equal to N and (ii) selecting the limited SOC in response to a determination that the amount of time is greater than N, wherein N corresponds to a predetermined amount of time.

12. The method of claim 10, wherein the assigned maximum SOC is selected by one of a user and a manufacturer of the vehicle and (ii) the intermediate SOC is greater than the limited SOC and less than the assigned maximum SOC.

13. The method of claim 10, further comprising charging the battery system to the limited SOC, stopping charging the battery system at a first time in response to the battery system reaching the limited SOC, and restarting charging the battery system to the target SOC at a second time subsequent to the first time, wherein the second time is selected based on an amount of time required to charge the battery system from the limited SOC to the target SOC.

* * * * *